United States Patent
Shi-Nash et al.

(10) Patent No.: US 10,762,538 B2
(45) Date of Patent: Sep. 1, 2020

(54) KNOWLEDGE MODEL FOR PERSONALIZATION AND LOCATION SERVICES

(71) Applicant: Singapore Telecommunications, Ltd., Singapore (SG)

(72) Inventors: Amy Shi-Nash, Singapore (SG); James Christian Decraene, Singapore (SG); The Agh Dang, Singapore (SG)

(73) Assignee: DataSpark, Pte. Ltd., Singapore (SG)

( * ) Notice: Subject to any disclaimer, the term of this patent is extended or adjusted under 35 U.S.C. 154(b) by 531 days.

(21) Appl. No.: 15/304,536

(22) PCT Filed: Apr. 24, 2014

(86) PCT No.: PCT/IB2014/060987
§ 371 (c)(1),
(2) Date: Oct. 17, 2016

(87) PCT Pub. No.: WO2015/162458
PCT Pub. Date: Oct. 29, 2015

(65) Prior Publication Data
US 2017/0039602 A1    Feb. 9, 2017

(51) Int. Cl.
| | |
|---|---|
| *G06N 5/00* | (2006.01) |
| *H04W 4/02* | (2018.01) |
| *G06F 16/95* | (2019.01) |
| *G06Q 10/00* | (2012.01) |
| *G06Q 30/02* | (2012.01) |
| *G06Q 50/00* | (2012.01) |
| *G06F 16/9535* | (2019.01) |
| *G06F 16/901* | (2019.01) |

(Continued)

(52) U.S. Cl.
CPC ..... *G06Q 30/0271* (2013.01); *G06F 16/9024* (2019.01); *G06F 16/9535* (2019.01); *G06N 5/022* (2013.01); *G06N 5/04* (2013.01); *G06Q 10/00* (2013.01); *G06Q 30/02* (2013.01); *G06Q 50/01* (2013.01)

(58) Field of Classification Search
CPC .... G06Q 30/0271; G06Q 10/00; G06Q 30/02; G06Q 50/01; G06F 16/9535; G06F 16/9024; G06N 5/022; G06N 5/04; H04W 4/02
USPC ...................................... 706/1–62
See application file for complete search history.

(56) References Cited

U.S. PATENT DOCUMENTS

| | | |
|---|---|---|
| 3,057,726 A | 10/1962 | Teignmouth |
| 3,102,813 A | 9/1963 | Teignmouth et al. |
| 3,984,326 A | 10/1976 | Bendel |

(Continued)

*Primary Examiner* — Brandon S Cole
(74) *Attorney, Agent, or Firm* — Russell Krajec; Krajec Patent Offices, LLC

(57) ABSTRACT

A knowledge model is derived from many different data sources, including activities of a person's mobile devices and various media consumption habits. A graph may be built having various nodes representing concepts from the data sources and edges representing relationships between them. From the graph, various inferences may be made that can provide insight that could not otherwise be obtained. The knowledge model may be deployed as several services, including rich geolocation services, recommendation services, and other services. The services may be accessed through an application programming interface, which may be a paid service with various payment options.

22 Claims, 11 Drawing Sheets

(51) Int. Cl.
*G06N 5/02* (2006.01)
*G06N 5/04* (2006.01)

(56) References Cited

U.S. PATENT DOCUMENTS

| | | | |
|---|---|---|---|
| 4,552,060 | A | 11/1985 | Redl et al. |
| 5,906,151 | A | 5/1999 | Firestone et al. |
| 6,744,383 | B1 | 6/2004 | Alfred et al. |
| 6,882,930 | B2 | 4/2005 | Trayford et al. |
| 7,161,497 | B2 | 1/2007 | Gueziec |
| 7,221,287 | B2 | 5/2007 | Gueziec et al. |
| 7,765,176 | B2 | 7/2010 | Simmons et al. |
| 8,046,319 | B2 | 10/2011 | Satir et al. |
| 8,214,883 | B2 | 7/2012 | Obasanjo et al. |
| 8,331,936 | B2 | 12/2012 | Alonso-Rubio et al. |
| 8,386,495 | B1 | 2/2013 | Sandler et al. |
| 8,423,494 | B2 | 4/2013 | Barrett et al. |
| 8,446,842 | B2 | 5/2013 | Cao et al. |
| 8,478,512 | B2 | 7/2013 | Nortrup |
| 8,583,659 | B1 | 11/2013 | Alexandrescu et al. |
| 8,639,756 | B2 | 1/2014 | Boström et al. |
| 8,666,643 | B2 | 3/2014 | McBride et al. |
| 8,693,458 | B2 | 4/2014 | Smartt et al. |
| 8,725,796 | B2 | 5/2014 | Serena |
| 8,731,835 | B2 | 5/2014 | Chidlovskii et al. |
| 8,739,016 | B1 | 5/2014 | Goldman et al. |
| 8,799,461 | B2 | 8/2014 | Herz et al. |
| 8,805,605 | B2 | 8/2014 | Cooper et al. |
| 8,819,009 | B2 | 8/2014 | Wana et al. |
| 8,825,350 | B1 | 9/2014 | Robinson |
| 8,849,823 | B2 | 9/2014 | Gotz et al. |
| 8,868,340 | B1 | 10/2014 | Rinckes et al. |
| 8,938,500 | B1 | 1/2015 | Acharya |
| 9,008,933 | B2 | 4/2015 | Cooper et al. |
| 9,141,656 | B1 | 9/2015 | Lopyrev et al. |
| 9,165,304 | B2 | 10/2015 | Weiss et al. |
| 9,195,722 | B1 | 11/2015 | Liu et al. |
| 9,196,157 | B2 | 11/2015 | Hardin et al. |
| 9,494,694 | B1 | 11/2016 | Dong et al. |
| 9,589,303 | B2 | 3/2017 | Belov et al. |
| 9,754,485 | B2 | 9/2017 | Holleczek et al. |
| 2004/0030670 | A1 | 2/2004 | Barton |
| 2004/0058678 | A1 | 3/2004 | deTorbal |
| 2005/0114383 | A1 | 5/2005 | Beringer et al. |
| 2006/0074545 | A1 | 4/2006 | Kim |
| 2006/0240841 | A1 | 10/2006 | Bhattacharya |
| 2007/0088490 | A1 | 4/2007 | Sutardja |
| 2007/0208497 | A1 | 9/2007 | Downs et al. |
| 2008/0004789 | A1 | 1/2008 | Horvitz et al. |
| 2008/0014904 | A1 | 1/2008 | Crimi et al. |
| 2008/0161028 | A1* | 7/2008 | Fonde .................. H04L 51/14 455/466 |
| 2008/0188242 | A1 | 8/2008 | Carlson et al. |
| 2009/0005002 | A1 | 1/2009 | Agarwal |
| 2009/0203352 | A1 | 8/2009 | Fordon et al. |
| 2009/0216704 | A1 | 8/2009 | Zheng et al. |
| 2010/0007552 | A1 | 1/2010 | Oda et al. |
| 2010/0120449 | A1 | 5/2010 | Jakorinne et al. |
| 2011/0099046 | A1 | 4/2011 | Weiss et al. |
| 2011/0099047 | A1 | 4/2011 | Weiss et al. |
| 2011/0099048 | A1 | 4/2011 | Weiss et al. |
| 2011/0145262 | A1 | 6/2011 | Jamjoom et al. |
| 2011/0176523 | A1 | 7/2011 | Huang et al. |
| 2011/0310733 | A1 | 12/2011 | Tzamaloukas et al. |
| 2012/0096002 | A1 | 4/2012 | Sheehan et al. |
| 2012/0221231 | A1 | 8/2012 | Nagata et al. |
| 2012/0226522 | A1 | 9/2012 | Weiss et al. |
| 2012/0245881 | A1 | 9/2012 | Takaoka |
| 2012/0266081 | A1 | 10/2012 | Kao |
| 2012/0296885 | A1 | 11/2012 | Gontmakher et al. |
| 2013/0059607 | A1 | 3/2013 | Herz et al. |
| 2013/0066548 | A1 | 3/2013 | Gruen et al. |
| 2013/0073473 | A1 | 3/2013 | Heath |
| 2013/0085659 | A1 | 4/2013 | Bekaert |
| 2013/0103290 | A1 | 4/2013 | Hardin et al. |
| 2013/0143521 | A1 | 6/2013 | Hernandez et al. |
| 2013/0170484 | A1 | 7/2013 | Kang et al. |
| 2013/0173633 | A1 | 7/2013 | Piepgrass et al. |
| 2013/0185189 | A1 | 7/2013 | Stewart |
| 2013/0191325 | A1 | 7/2013 | Hatami-Hanza |
| 2013/0198188 | A1 | 8/2013 | Huang et al. |
| 2013/0204525 | A1 | 8/2013 | Pfeifle |
| 2013/0211706 | A1 | 8/2013 | MacNaughtan et al. |
| 2013/0238700 | A1* | 9/2013 | Papakipos ............... G06F 21/81 709/204 |
| 2013/0260791 | A1 | 10/2013 | Malinovskiy et al. |
| 2013/0260795 | A1* | 10/2013 | Papakipos ............... H04W 4/21 455/456.3 |
| 2013/0285855 | A1* | 10/2013 | Dupray ................... G01S 19/48 342/451 |
| 2013/0332490 | A1* | 12/2013 | Hu .......................... G06N 5/02 707/798 |
| 2014/0012498 | A1 | 1/2014 | Gustafson et al. |
| 2014/0058913 | A1 | 2/2014 | Hinesley et al. |
| 2014/0088865 | A1 | 3/2014 | Thies et al. |
| 2014/0108308 | A1 | 4/2014 | Stout et al. |
| 2014/0122043 | A1 | 5/2014 | Bellamy et al. |
| 2014/0149514 | A1 | 5/2014 | Ryan et al. |
| 2014/0164390 | A1 | 6/2014 | Hampapur et al. |
| 2014/0171104 | A1 | 6/2014 | Murphy et al. |
| 2014/0189524 | A1 | 7/2014 | Murarka et al. |
| 2014/0189530 | A1 | 7/2014 | Anand et al. |
| 2014/0200805 | A1 | 7/2014 | Modica et al. |
| 2014/0222321 | A1 | 8/2014 | Petty et al. |
| 2014/0244149 | A1 | 8/2014 | Relyea et al. |
| 2014/0244752 | A1 | 8/2014 | Tseng |
| 2014/0280224 | A1* | 9/2014 | Feinberg ............. G06F 16/9024 707/748 |
| 2014/0330548 | A1 | 11/2014 | Appel et al. |
| 2014/0330819 | A1 | 11/2014 | Raina et al. |
| 2015/0006247 | A1 | 1/2015 | Batra et al. |
| 2015/0065159 | A1 | 3/2015 | Alpert et al. |
| 2015/0148068 | A1 | 5/2015 | Planas et al. |
| 2015/0172856 | A1 | 6/2015 | Vanderwater et al. |
| 2015/0178283 | A1* | 6/2015 | Garg .................... H04L 67/10 707/748 |
| 2015/0278375 | A1 | 10/2015 | Kim et al. |
| 2015/0285651 | A1 | 10/2015 | Cerecke et al. |
| 2015/0285656 | A1 | 10/2015 | Verheyen et al. |
| 2015/0350890 | A1 | 12/2015 | Arunkumar et al. |
| 2015/0354973 | A1 | 12/2015 | Wang et al. |
| 2016/0021152 | A1 | 1/2016 | Maguire et al. |
| 2016/0078365 | A1 | 3/2016 | Baumard |
| 2016/0327397 | A1 | 11/2016 | Cordova et al. |
| 2016/0371973 | A1 | 12/2016 | Holleczek et al. |
| 2017/0039602 | A1 | 2/2017 | Shi-Nash et al. |
| 2017/0064515 | A1 | 3/2017 | Heikkila et al. |
| 2017/0171720 | A1 | 6/2017 | Holleczek et al. |
| 2017/0195854 | A1 | 7/2017 | Shi-Nash et al. |
| 2017/0212945 | A1 | 7/2017 | Shankar et al. |
| 2017/0262653 | A1 | 9/2017 | Dang et al. |
| 2017/0277767 | A1 | 9/2017 | Dang et al. |
| 2017/0277907 | A1 | 9/2017 | Dang et al. |

* cited by examiner

400
EXAMPLE GRAPH
OF
RELATIONSHIPS

KNOWLEDGE MODEL FOR PERSONALIZATION AND LOCATION SERVICES

CROSS REFERENCE TO RELATED APPLICATIONS

This application claims priority to and benefit of Patent Cooperation Treaty application PCT/IB2014/060987 entitled "Knowledge Model for Personalization and Location Services" by Singapore Telecommunications Limited on 24 Apr. 2014, the entire contents of which are hereby expressly incorporated by reference for all they disclose and teach.

BACKGROUND

Many services, from advertising and web searches to restaurant recommendations and travel assistance can benefit from personalization. Rather than attempting to provide a one-size-fits-all solution, a personalized service can be more engaging, useful, entertaining, and effective.

SUMMARY

A knowledge model is derived from many different data sources, including activities of a person's mobile devices and various media consumption habits. A graph may be built having various nodes representing concepts from the data sources and edges representing relationships between them. From the graph, various inferences may be made that can provide insight that could not otherwise be obtained. The knowledge model may be deployed as several services, including rich geolocation services, recommendation services, and other services. The services may be accessed through an application programming interface, which may be a paid service with various payment options.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
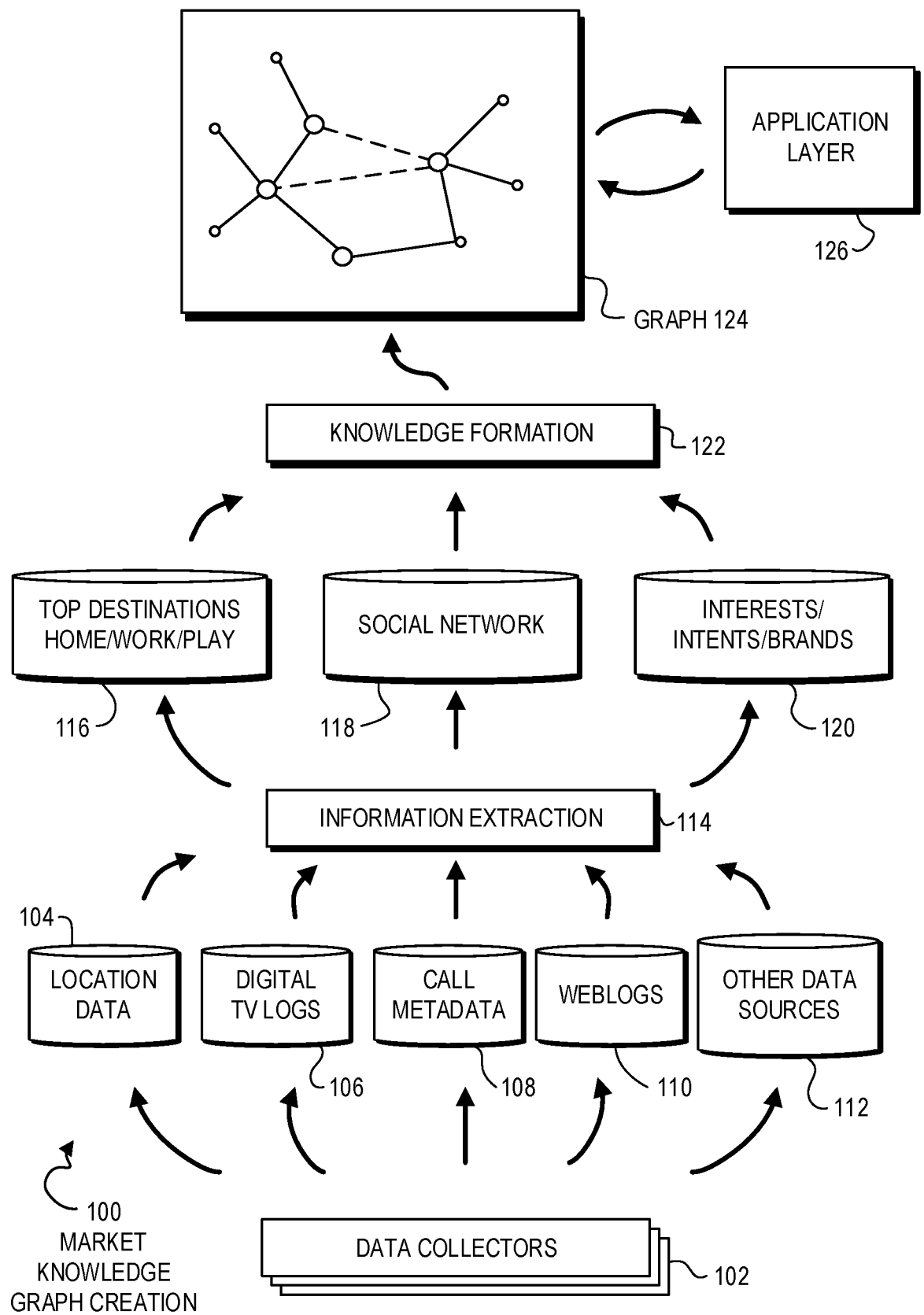
FIG. 1 is a diagram illustration of an embodiment showing a method for generating a knowledge graph from various databases.

Knowledge Model for Personalization and Location Services

A knowledge model may be constructed by aggregating data from many different sources into a unified graph where nodes represent ontological elements of user's lives, and edges represent relationships between the ontological elements. The graph may be built using metadata gathered from many different communications networks, including mobile telephony, internet access, television and other media, and various geo-location information. The graph may be supplemented by other data sources, and the resultant graph may be mined to identify implied or indirect relationships that may be inferred from the graph. The graph may be analyzed to provide various services, including geo-location services, demographic services, recommendation services, and other services.

The knowledge model may have some elements and relationships that are transitory or time-based, while other elements may be longer lived. The time-based elements may fall into several categories, including ephemeral relationships that may occur for a period of time and then degrade or end all together, as well as recurring relationships that may depend on time of day, day of week, or have other seasonality.

Examples of time-based relationships may include the relationship between a person and their employer. Such a relationship may have a recurring element that reflects the time the person spends at their job throughout the day, and such a relationship may terminate abruptly when the person moves to a different job. A person may also develop a time-based relationship with a certain hobby, which a person may enjoy intensely for a period of time, then the intensity may slowly degrade as the person's interests change to a different hobby or pastime.

The knowledge model may have various modifiers on the observed or implied relationships. The modifiers may reflect the strength of a relationship, which may be increased by the number of repeated observations or by applying a strength relationship using a heuristic or other algorithm.

A use scenario for a knowledge model may include the following: a graph may be constructed that combines metadata from a user's interactions with a mobile telephone service with the user's interactions with the world wide web and the same user's media consumption habits. Metadata from the mobile telephone network may provide time of day information and person-to-person interactions. From these metadata, relationships between the user and other entities, such as friends and family, coworkers, and various businesses may be uncovered. The user's home and work schedules may also be uncovered from these metadata. From the user's media consumption habits, the user's interests may be uncovered.

In the use scenario, interesting and useful queries may be performed. For example, demographic information about certain locations may be uncovered. Based on the location of a potential restaurant near many officer workers, what are the demographics of people likely to have lunch in the area? What will the demographics be in the evening, when people go out to dine and socialize? Such information may help a restaurateur select appropriate decor, menu, and other items to attract the people who are in the area.

In another query, key influencers for a specific brand's products may be identified within a neighborhood. Those influencers may be awarded coupons, special promotions, samples of new products, or other items that may further cultivate the influencer's interest in a brand's products. The brand's highly targeted marketing strategy may focus on these people who may generate a much higher return for the advertising investment than traditional, broad-stroke advertising.

In yet another query, a recommendation engine may suggest things to do, restaurants, media, and other items to a user that may be of interest. The recommendation engine may tailor the recommendations based on a user's likes and dislikes. For example, a person who enjoys cooking and food, which may be identified from their media viewing habits, may be shown opportunities to attend a cooking class when the user is in a new location away from work and home. Such a location may indicate that the user is on holiday, and such an assumption may be buttressed by the user's contact with various travel planning businesses.

When personally identifiable information (PII) is collected in the various databases and use scenarios, users may be given an opportunity to opt in or opt out of such data collection. In many embodiments, personally identifiable information may be anonymized prior to being aggregated into a graph representation with other data sources. Various other mechanisms may be used to ensure that personally identifiable information is not collected, stored, transmitted, or analyzed in any illegal or improper manner.

Throughout this specification, like reference numbers signify the same elements throughout the description of the figures.

In the specification and claims, references to "a processor" include multiple processors. In some cases, a process that may be performed by "a processor" may be actually performed by multiple processors on the same device or on different devices. For the purposes of this specification and claims, any reference to "a processor" shall include multiple processors, which may be on the same device or different devices, unless expressly specified otherwise.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is an illustration showing creation of a market knowledge graph. The market knowledge graph may be created from multiple data sources, which may be processed through an information extraction process, then again through a knowledge formation process to create a graph 124. Once the graph 124 is created, various queries may be performed against it using a query engine 126.

The market knowledge graph 124 may assemble many data elements to create a graph of various relationships between ontological elements, which may be items such as people, places, things, brands, locations, media, and other items. The relationships between the ontological elements may be strengthened, implied, or otherwise modified by knowledge formation processes, which may include heuristics or other analyses.

Various data collectors 102 may gather data from many different sources. The data sources may be various media or communication networks, include cellular telephone networks, internet service provider networks, digital television media networks, or many other data sources.

Examples of the data sources may include location data 104, which may be gathered through any device that a person may have that can detect location. For example, a cellular telephone or other mobile device may be able to detect location through an internal Global Positioning System (GPS) receiver. In many cases, a mobile device may be able to determine its location through triangulation of wireless access points, cellular telephony system, or other mechanism.

The location data 104 may be associated with a specific user. For a cellular telephone, the location of the device may assumed to be the same location as the subscriber to whom the telephone belongs. Many other mobile devices may also gather location data 104, such as tablet and laptop computers, personal fitness devices, or other wearable or portable computing devices.

Many other devices may have a linkage between a specific person and a location. For example, an automobile, bus, train, airplane, boat, or other transportation vehicle may be associated with people in the vehicle and the route and timing of the vehicle. In such cases, the location data 104 may be culled from a transportation system's computer, which may track which passengers are on which vehicle. Such databases may be provided by airlines, ferry operators, transit system operators, or other transportation system.

Call metadata 106 may reflect any communication metadata between two or more people. The call metadata 106 may be gathered from a mobile telephone operator, for example, where various metadata for each call may be collected. The metadata may identify the origin and receiving stations, the time and duration of the call, and other information. The call metadata 106 may additionally include location data 104 in some cases.

The call metadata 106 may not include content or details of the communication between users, but may only include various metadata.

Weblogs 108 may include metadata for a user's browsing history or other communications over the world wide web or other data network. The weblogs 108 may include the time, duration, and other connection parameters for communication sessions for a computer. While the contents or payloads of a communication may not be gathered, the location, timing, and direction of the communication may be.

Digital television logs 110 may include a user's viewing history of a digital television system. In many cases, the digital television system may have a digital video recorder, which may capture broadcast video for later viewing. The digital television logs 110 may include the shows that were viewed on the system, as well as the shows that were captured and various parameters about the replay sessions for the recorded shows.

Other data sources 112 may include metadata gathered from game consoles, electronic reader platforms, or other systems. The other data sources 112 may also include information from electronic social networks or any other source of various ontological elements or relationships of the ontological elements that may be available.

An information extraction process 114 may process the various data sources to identify nodes and edges for the graph 124. The nodes may represent an ontological element and the edges may represent relationships between the ontological elements.

The ontological elements may be any element that may relate to human beings and their surroundings, such as individual people, their homes, places of work, businesses that supply goods and services, media outlets, media content, hobbies, interests, or any other element. The type of elements in a graph 124 may depend on the type of raw data that may be available as well as the types of queries that may be supported by a query engine 126.

Various items of interest may be extracted from the first layer of information extraction 114. Various destinations 116 may be identified from the various location data 104. The destinations 116 may include places of work or recreation, homes, vacation locations, business locations including restaurants and shopping, and other destinations.

A social network 118 may be constructed from the various data sources that may link various people together by different affiliations. Such affiliations may include familial relationships, as well as coworker relationships, religious and other social group relationships, and other person to person relationships.

Interests 120 may include interests in various topics as well as intents or goals for a person. An interest may be a work related topic, such as computer programming or project management, as well as a hobby or leisure interest, such as travel, cooking, or gardening. The interests 120 may also include companies, brands, or their products that may be of interest to a person.

Knowledge formation 122 may be a secondary analysis of the information extracted from the raw data. The knowledge formation 122 may perform various tasks such as inferring relationships, prediction, and otherwise further enhancing the graph 124. The knowledge formation 122 may be performed using heuristics or other algorithms. In some cases, such algorithms may be developed for specific types of inferred or enhanced relationships.

A query engine 126 may perform queries against the graph 124. Examples of various queries may be discussed later in this specification.

Figure 2:
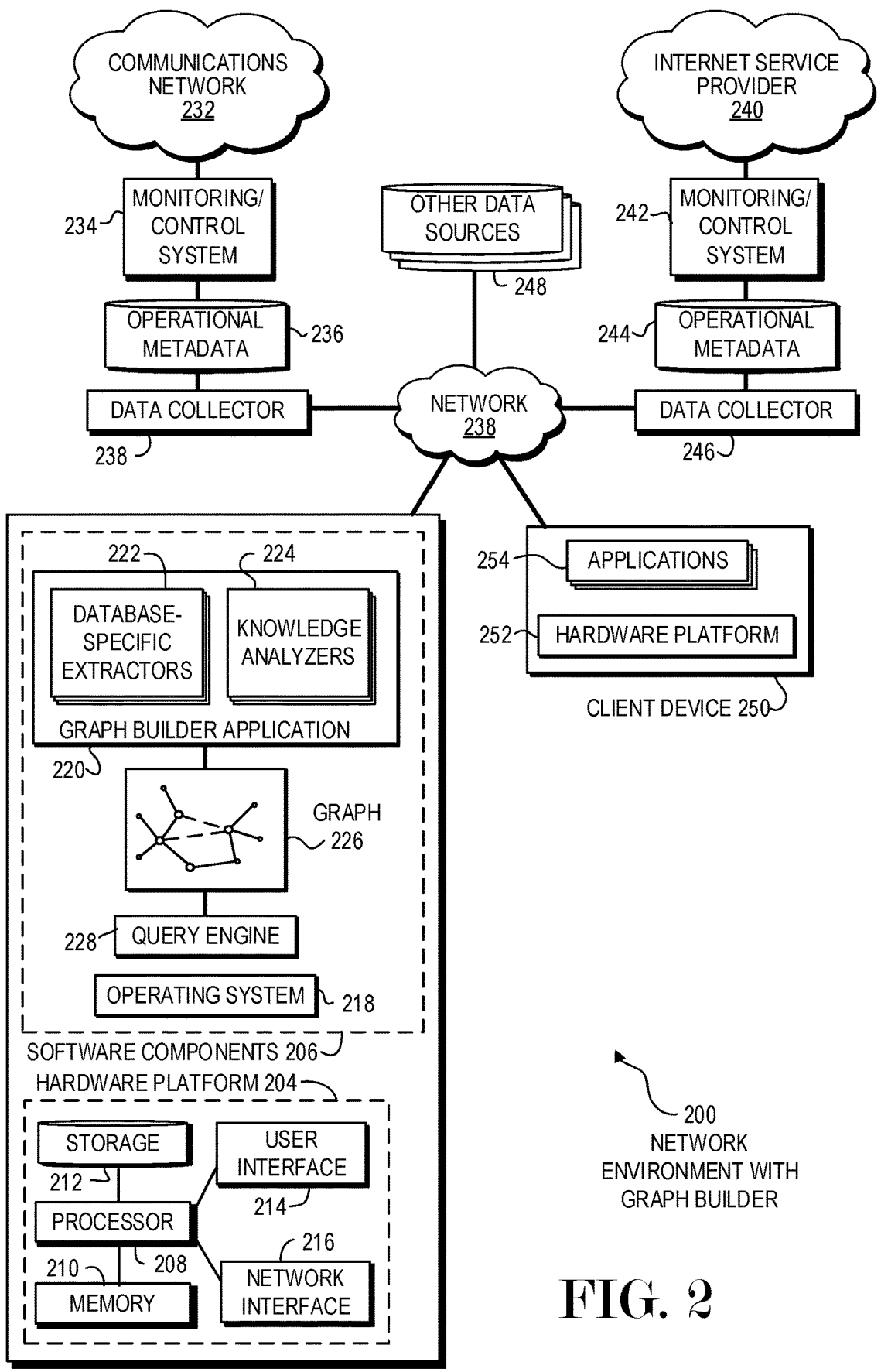
FIG. 2 is a diagram illustration of an embodiment showing a network environment with devices that gather data and create a knowledge graph from those data.

FIG. 2 is a diagram of an embodiment 200 showing components that may collect data to generate a graph showing ontological elements and relationships between those elements. The components are illustrated as being on different hardware platforms as merely one example topology.

The diagram of FIG. 2 illustrates functional components of a system. In some cases, the component may be a hardware component, a software component, or a combination of hardware and software. Some of the components may be application level software, while other components may be execution environment level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 200 illustrates a device 202 that may have a hardware platform 204 and various software components. The device 202 as illustrated represents a conventional computing device, although other embodiments may have different configurations, architectures, or components.

In many embodiments, the device 202 may be a server computer. In some embodiments, the device 202 may still also be a desktop computer, laptop computer, netbook computer, tablet or slate computer, wireless handset, cellular telephone, game console or any other type of computing device. In some embodiments, the device 202 may be implemented on a cluster of computing devices, which may be a group of physical or virtual machines.

The hardware platform 204 may include a processor 208, random access memory 210, and nonvolatile storage 212. The hardware platform 204 may also include a user interface 214 and network interface 216.

The random access memory 210 may be storage that contains data objects and executable code that can be quickly accessed by the processors 208. In many embodiments, the random access memory 210 may have a high-speed bus connecting the memory 210 to the processors 208.

The nonvolatile storage 212 may be storage that persists after the device 202 is shut down. The nonvolatile storage 212 may be any type of storage device, including hard disk, solid state memory devices, magnetic tape, optical storage, or other type of storage. The nonvolatile storage 212 may be read only or read/write capable. In some embodiments, the nonvolatile storage 212 may be cloud based, network storage, or other storage that may be accessed over a network connection.

The user interface 214 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 216 may be any type of connection to another computer. In many embodiments, the network interface 216 may be a wired Ethernet connection. Other embodiments may include wired or wireless connections over various communication protocols.

The software components 206 may include an operating system 218 on which various software components and services may operate.

A graph builder application 220 may consist of database-specific extractors 222 and knowledge analyzers 224. The graph builder application 220 may create, update, and maintain a graph 226 that may be queried by a query engine 228.

The graph builder application 220 may update the graph 228 as new data are received. In many deployments, a graph builder application 220 may be continually updating and building the graph 226 in response to receiving data in real time or near-real time.

The database-specific extractors 220 may cull data from various databases and update or build the graph 226. For example, a database extractor may be created for a cellular telephone network metadata database and a second database extractor may be created for analyzing weblogs. Both extractors may add nodes and edges to the graph 226.

The knowledge analyzers 224 may be algorithms, routines, or other mechanisms to apply different rules to the data. The rules may infer relationships, as well as strengthen or weaken relationships based on the presence or absence of different elements defined in the algorithm. A simple example of a knowledge analyzer may add a coworker relationship between two people who work at the same place of business. Such a relationship may not be identified from the raw data, but the knowledge analyzer may create the relationship based on a heuristic or other algorithm.

The knowledge analyzers 224 may represent second level analyses that derive insights from the data. The knowledge analyzers 224 may be algorithms designed by data scientists with the help of domain knowledge experts, and may automatically generate insights from combinations of data sources. The insights may identify relationships and relationship strengths that may not be present in a single data source. For example, a user that may watch a cooking show on television may be assumed to have a slight affinity for cooking as a hobby. When that user also patronizes high end restaurants and visits websites for haute cuisine cooking schools, that user may have a deep interest in cooking at a professional level. The combination of data from different sources may strengthen a relationship from a mere passing interest to a serious hobby or professional interest.

The query engine 228 may receive various requests and return data derived from the graph 226. The query engine 228 may have a visual user interface where a user may be able to visualize and interact with the graph. The query engine 228 may have an application programming interface (API) that may respond to programmatic requests from applications. The applications may use the query engine 228 to provide data for subsequent analyses or other purposes.

A network 230 may connect the device 202 to other systems. In some cases, the network 230 may be the Internet, a local area network, a wide area network, a wired network, a wireless network, some other network, or a combination of different networks.

Some of the data in the graph 226 may be derived from the operations of a communications network 232. The communications network 232 may be, for example, a wireless network where users communicate with mobile telephones. The communications network 232 may be a wired telephony network, a pager network, a private exchange network, a wireless radio network, or any other type of network.

A monitoring and control system 234 may manage the communications network 232. The monitoring and control system 234 may perform routing, network management, authentication, accounting, and administration functions, or other functions. Operational metadata 236 may be collected from the monitoring and control system 234. A data collector 238 may gather the metadata and transmit the metadata to a corresponding database specific extractor 222 to add these data to the graph 226.

Similarly, an internet service provider 240 may have a monitoring and control system 242. The internet service provider 240 may provide internet connections to various end users, and the monitoring and control system 242 may gather operational metadata 244 during various administrative operations. The operational metadata 244 may include connections between users and various websites or services. A data collector 246 may and transmit the operational metadata 244 to a corresponding database specific extractor 222 to add these data to the graph 226.

Many other data sources 248 may be used to build or supplement the graph 226. The other data sources may be any data source may be relate to objects stored in the graph 226. For example, a data source may include a description or analysis of a television show that may define the topics of the show. The topics may be used to establish a relationship between a user's viewing of the show and the user's interests in the various topics. Such relationships may be inferred using the combination of data sources.

A client device 250 may be any device that may perform requests to the query engine 228 as part of an application. The client device 250 may have a hardware platform 252 which may be similar to that described for the hardware platform 204. Various applications 254 may perform queries against the graph 226 by sending a request to the query engine 228 and receiving the results of the query for further display or processing.

Figure 3:
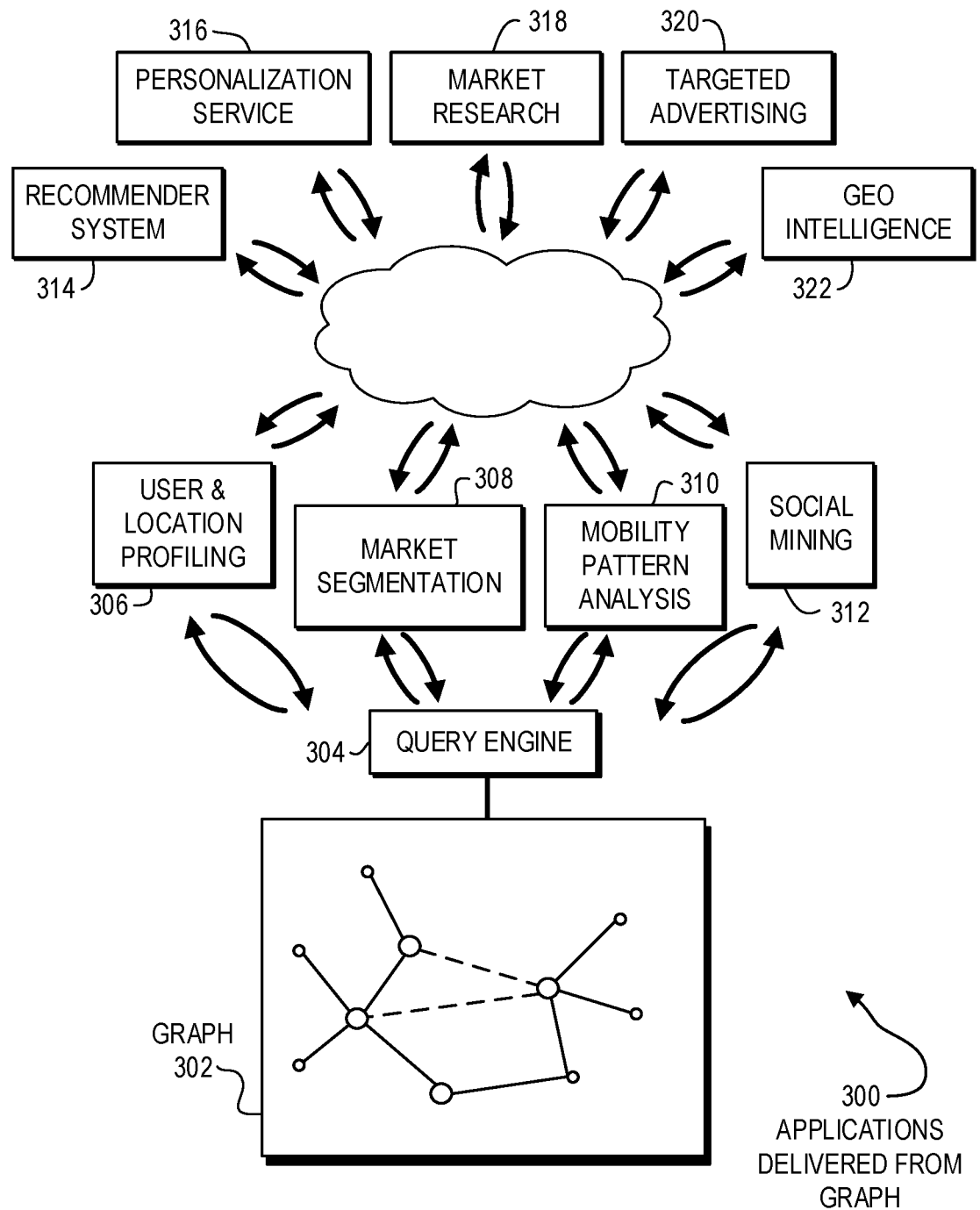
FIG. 3 is a diagram illustration of an embodiment showing various applications that may be delivered using graph data.

FIG. 3 is a diagram illustration of an example embodiment 300 showing applications that may be delivered from a graph derived from multiple data sources. The graph 302 may represent the graphs 124 or 226 from embodiments 100 or 200, respectively. Embodiment 300 may illustrate two levels of analysis or applications that may be drawn from the graph 302.

A query engine 304 may perform various queries against the graph 302. From these queries, several analyses may be performed, such as user and location profiling 306, market segmentation 308, mobility pattern analysis 310, social mining 312, and others.

User and location profiling 306 may develop profiles of various users or locations. For example, a user profile may identify a user's likes, dislikes, and other characteristics. Typically, such information may be anonymized so that individual persons are not identified. The profile may include any available data, such as a person's job, commute route and time, their hobbies, interests, likely purchasing habits, estimated purchasing power, and other information.

A location profile may include demographic information about the people who visit a location, along with their interests, occupations, and other factors.

Time-based factors may be present in some graphs. A time-based factor may identify certain parameters that vary with the time of day, day of week, season, holidays, or other interval. A query for a time-based factor may include a date and time parameter and a query engine may return a predicted or estimated value for a requested parameter that meets the date and time requested.

An example of a time-based factor may be the location of employees at a company. During a typical work day, the employees may be located at a place of business, but on a non-work day, the employees may be located at home or at a place of recreation.

Predictive models may be constructed for user and location profiles, along with many other data. The predictive models may be constructed by analyzing the time and endurance of various events, then determining a statistical model of those events. A predictive model may estimate the time-based factor using the statistical model for a given time or range of times.

Market segmentation 308 may be an analysis that identifies the components of a given market. An example may be to define the types of people who enjoy cooking as a hobby. The data may include a breakdown of the ages, occupations, and other hobbies enjoyed by this segment of population. Some factors may be time-based factors, such as the time of day that people engage media that are cooking related, such as cooking based websites or television shows.

Mobility pattern analysis 310 may be an analysis that identifies the flow patterns of people or other objects through various locations. Mobility pattern analysis may include traffic delays during rush hour as well as the flow and demographics of people through a shopping center or along a commercial road.

Social mining 312 may identify connections between individuals or groups of people. Such analysis may yield a rich demographic profile of groups of people, with their interests, relationships, affinity to various brands or products, and many other data points.

The various analyses such as user and location profiling 306, market segmentation 308, mobility pattern analysis 310, and social mining 312 may be combined into many different applications. Examples of such applications include various recommender systems 314, personalization services 316, market research 318, targeted advertising 320, and geo-intelligence services 322.

Recommender systems 314 may provide any type of recommendation for a person with a given profile. In the commercial world, there are many choices for different products. A recommender system 314 may narrow the choices for a person given their individual profile. For example, a person who enjoys many outdoor activities may be shown products that were selected by other people who also enjoy outdoor activities. A different person who enjoys indoor activities may be shown different products.

Recommender systems 314 may benefit from the diversity of data sources that generate the graph 302. For example, a metadata analysis of cellular telephone metadata may identify a user living in a certain neighborhood and commuting to work at a high technology company. Such analysis may begin to build a demographic profile of the user. Coupling that data with weblog analysis may uncover that the user may enjoy endurance athletics along with outdoor sports. A recommendation system may identify a demographic profile for a new person, which may be similar to the demographic profile of the analyzed user. The recommendation system may return outdoor sports information that may be interesting to the user because of the relationship uncovered in the metadata analysis.

A personalization service 316 may be any type of service that may customize or personalize an experience for a user. For example, a user who may be placing an online order from a restaurant may be presented with choices that are popular with other users who share the same interests and demographic profiles.

Market research services 318 may attempt to classify, categorize, and understand the interactions of customers and products. A demographic study may classify people who may be interested in certain products or classes of products, and may show detailed analyses that may include any type of relationship or ontological element that may be related to the product or people. A product study may show which types of people may be interested in a certain brand or type of product.

Targeted advertising services 320 may be advertising mechanisms that can target people with very specific demographics and interests. The demographics, interests, and other factors for a user may be gathered from the user's profile as defined in the graph 302. When an advertising opportunity is identified, such as an online advertisement, customized outdoor advertisement, or other opportunity, elements of a user's profile may be sent to an advertisement arbitrage system that may match the user's profile with an advertiser that may be trying to reach that type of user. The arbitrage system may return an advertisement that may be targeted for that user, making the interaction more useful for the user, as well as potentially profitable for the advertiser.

A geo-intelligence service 322 may provide details about locations. Such information may assist a business person in evaluating current or potential business opportunities in a geographical area. For example, a shopkeeper or restaurateur may wish to know the demographic of potential customers that pass by a place of business. Based on the geo-intelligence results, a shopkeeper may stock certain items tailored to the demographic. Similarly, a restaurateur may optimize a menu or offer specials that cater to the tastes of potential patrons.

The geo-intelligence example may also be one example of time-based data, where the shopkeeper or restaurateur may wish to understand traffic patterns and demographics based on time of day, day of week, or other time-dependent parameters.

Figure 4:
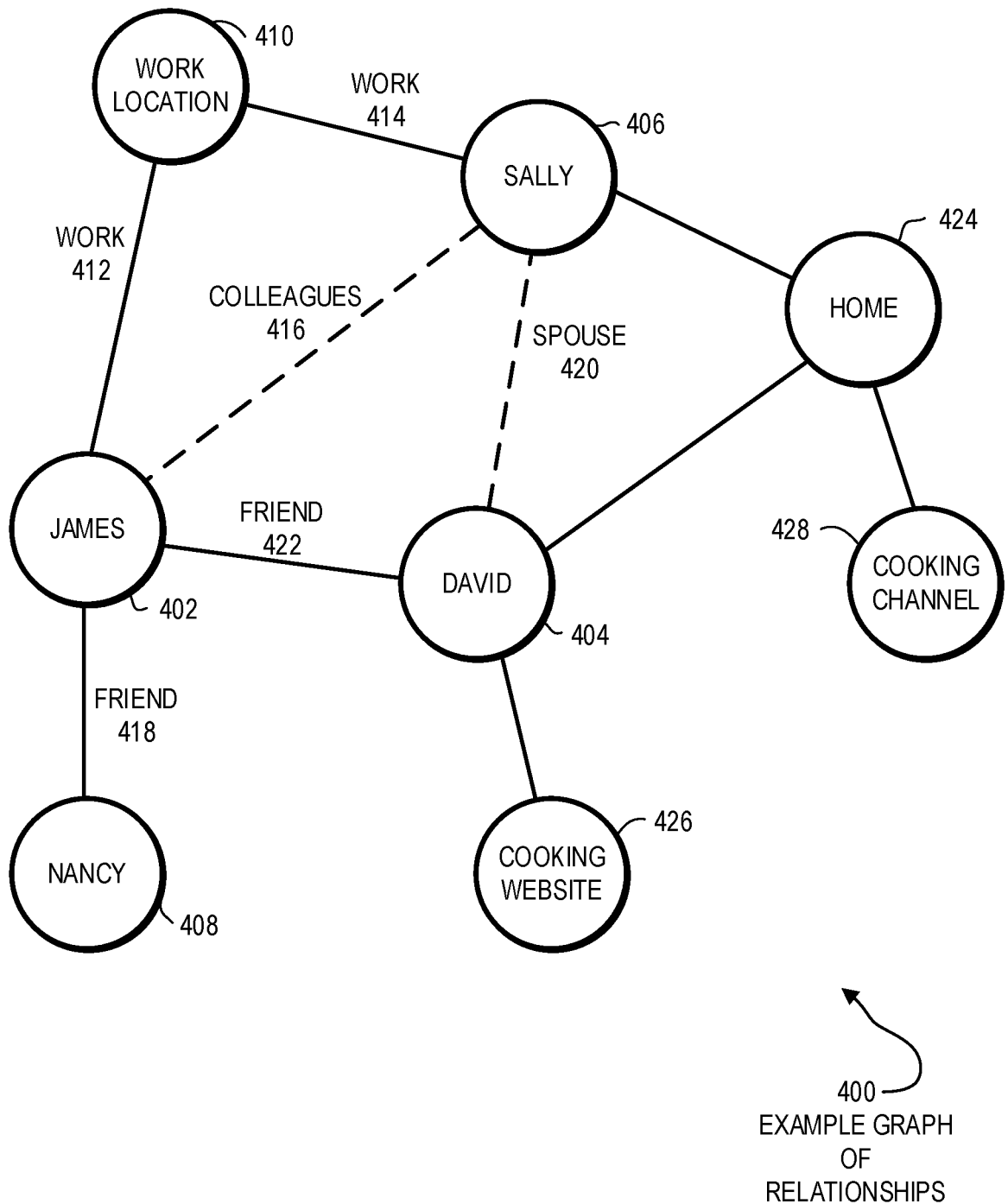
FIG. 4 is a diagram illustration of an embodiment showing an example graph of nodes and edges representing ontological elements and their relationships.

FIG. 4 is a diagram illustration of an embodiment 400 showing an example graph of relationships between ontological elements. Embodiment 400 is a very simplified example of a graph that may be constructed from various databases and the relationships that may be inferred from the data.

The graph may illustrate three people, James 402, David 404, Sally 406, and Nancy 408. James 402 and David 404 may have a friend relationship 422 because James and David talk on the phone or send text messages. A similar friend relationship 418 may be uncovered between James 402 and Nancy 408. These relationships may be derived from cellular telephone metadata.

Location analysis of James 402 and Sally 406 may indicate that both people are at a work location 410 at the same time. Both persons may attend their job at relatively the same time and on a daily basis, indicating that they both have work relationships 412 and 414 to the work location 410. An inferred coworker or colleague relationship 416 may be discovered by knowledge analysis, where a knowledge analysis routine may establish implied coworker relationships between people who work at the same location.

Sally 406 and David 404 may share a home location 424. The home location 424 may be identified by matching a geo-location with an address lookup database that may identify the geo-location coordinates as a residential area. Sally's location at the home location 424 may coincide with their time away from work location 410.

A cooking channel 428 may be viewed from a digital television device at the home 424. In some cases, the precise person who may be using a device may be unknown. However, David 404 may have visited a cooking website 426, which may infer that David 404 has an interest in cooking. This inference may be augmented by both the visit to the cooking website 426 as well as viewing the cooking channel 428, even though it may be unknown who in the home location 424 was actually viewing the cooking channel 428.

Figure 5:
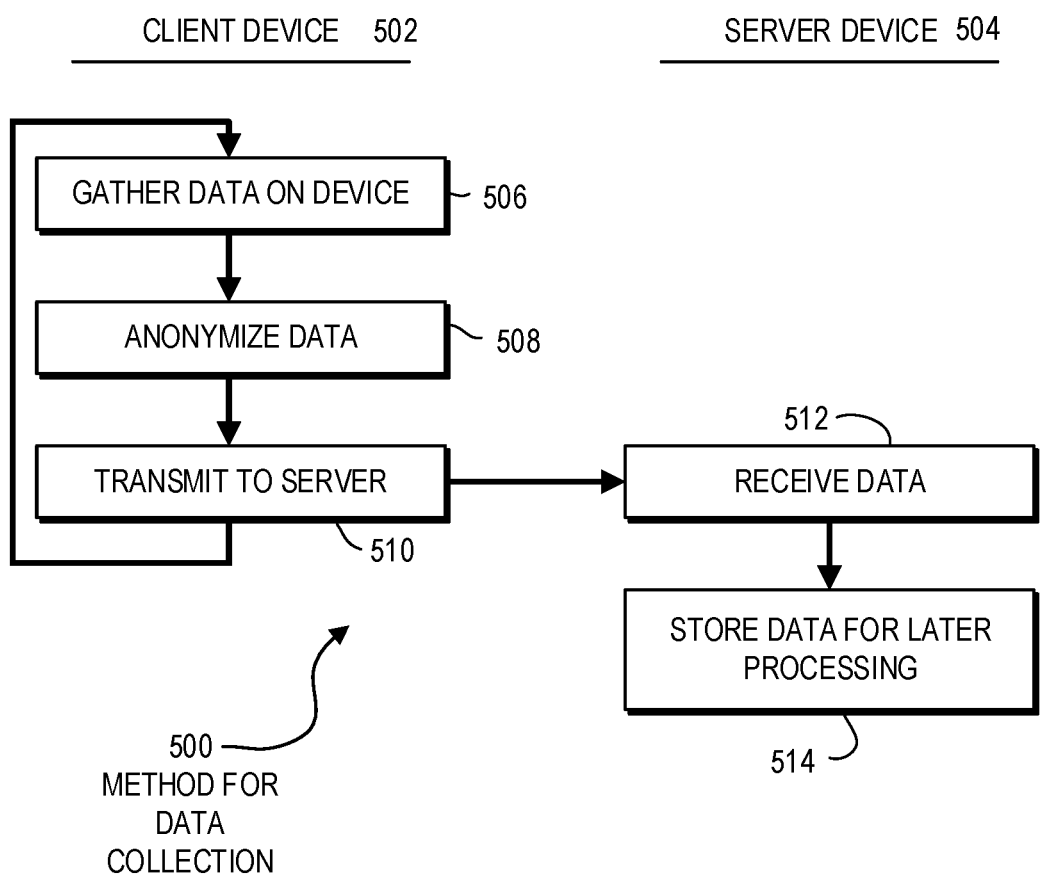
FIG. 5 is a timeline illustration of an embodiment showing a method for gathering data.

FIG. 5 is a timeline illustration of an embodiment 500 showing a method for collecting data. Embodiment 500 may illustrate the operations of a client device 502 which may act as a data collector, and a server device 504, which may receive and process the data.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principals of operations in a simplified form.

Embodiment 500 may illustrate a simple example of interactions that may be performed between a device that collects data and a server device that may receive and process the data.

A client device 502 may gather data on the device in block 506, anonymize data in block 508, and transmit the data to a server in block 510.

The server device 504 may receive the data in block 512 and store the data for later processing in block 514.

The client device may perform various pre-processing steps in block 508, including anonymizing the data. Some data that may be collected may include personally identifiable information (PII), and such PII may be scrubbed from the data prior to transmitting and storing the data. Several mechanisms may be used to anonymize the data, including reversible and irreversible encryption, randomization, or other mechanisms.

Figure 6:
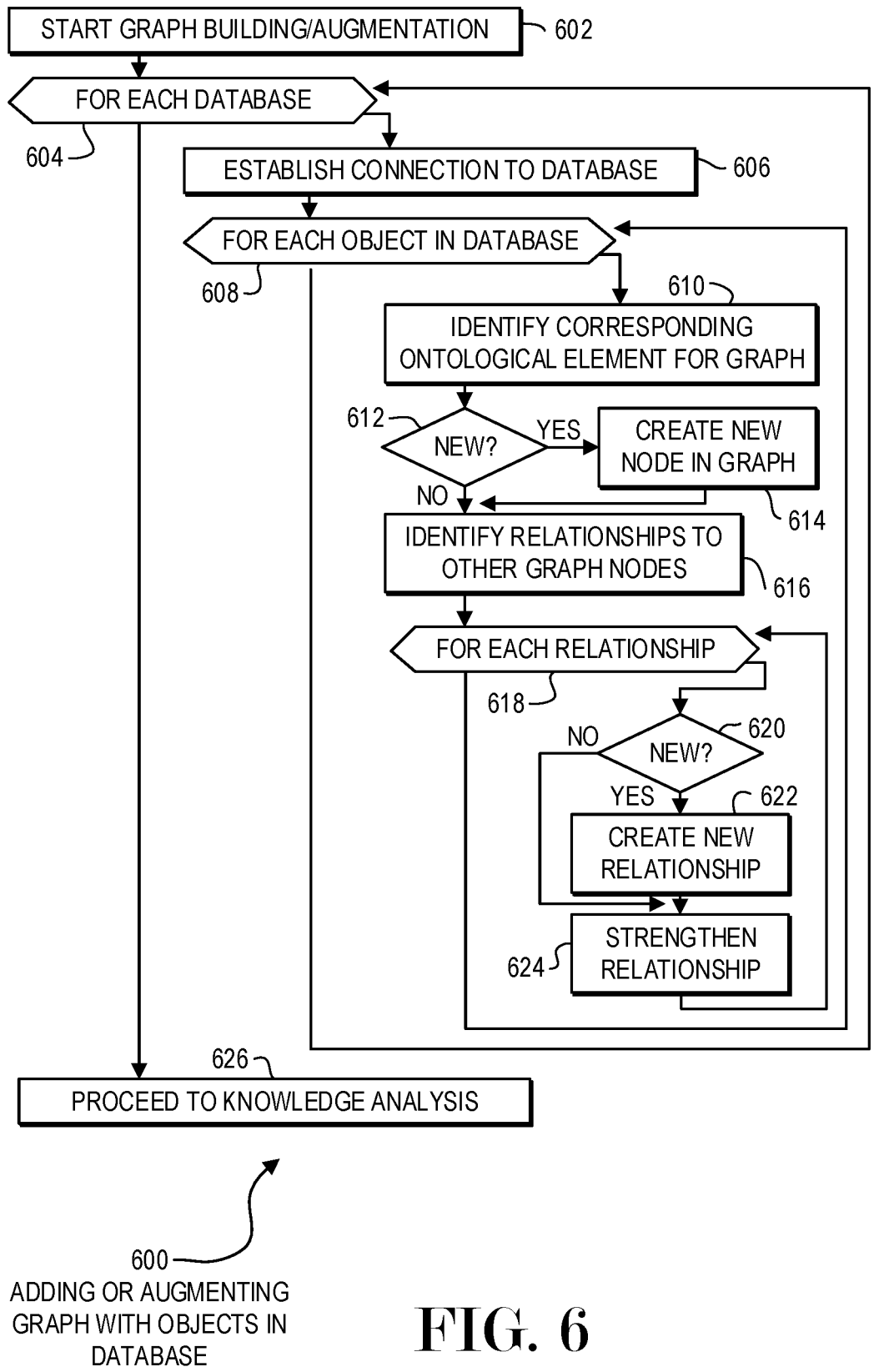
FIG. 6 is a flowchart illustration of an embodiment showing a method for adding or augmenting a knowledge graph with objects collected from a database.

FIG. 6 is a flowchart illustration of an embodiment 600 showing a method for adding or augmenting a graph with objects in a database. Embodiment 600 may illustrate a first level of data extraction that may be performed when receiving data from a database.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principals of operations in a simplified form.

Embodiment 600 may illustrate a process that may be performed to initially populate or augment a graph. The process may be performed on a repeating basis to add new nodes or edges to a graph, where the nodes may represent ontological elements, such as a person, location, interest, brand, product, or other element, and the edges may represent relationships between those elements. In many embodiments, a relationship may include a strength relationship, where the relationship may be strengthened or weakened based on additional data points.

The graph building or augmentation may begin in block 602.

Each database for which new data are available may be processed in block 604. For each database in block 604, a connection may be established to the database in block 606.

Each object in the database may be evaluated in block 608. For each object in block 608, a corresponding instance of a ontological element may be identified in the graph in block 610. If the object is not found in the graph in block 612, a new node may be created in the graph in block 614. The new node may represent a new instance of an ontological element in the graph.

The ontological element of a graph may be identified by matching a schema defining the database being analyzed with a schema of ontological elements of the graph. In some cases, an object in a database may not have a corresponding element in the graph and the object may be discarded.

The existing or potential relationships between the node and other nodes may be identified in block 616. For each of the relationships in block 618, if the relationship does not exist in block 620, a new relationship may be created in block 622. When the relationship does exist in block 620, the existing relationship may be strengthened in block 622.

The relationships identified in block 616 may be common relationships that may be derived directly from the data being analyzed. For example, if a person is physically located at a restaurant, nodes may be generated representing the person and the restaurant and a relationship may be established between the two nodes.

After processing each object in each database in block 608 and each database in block 604, the process may proceed to knowledge analysis in block 626.

Figure 7:
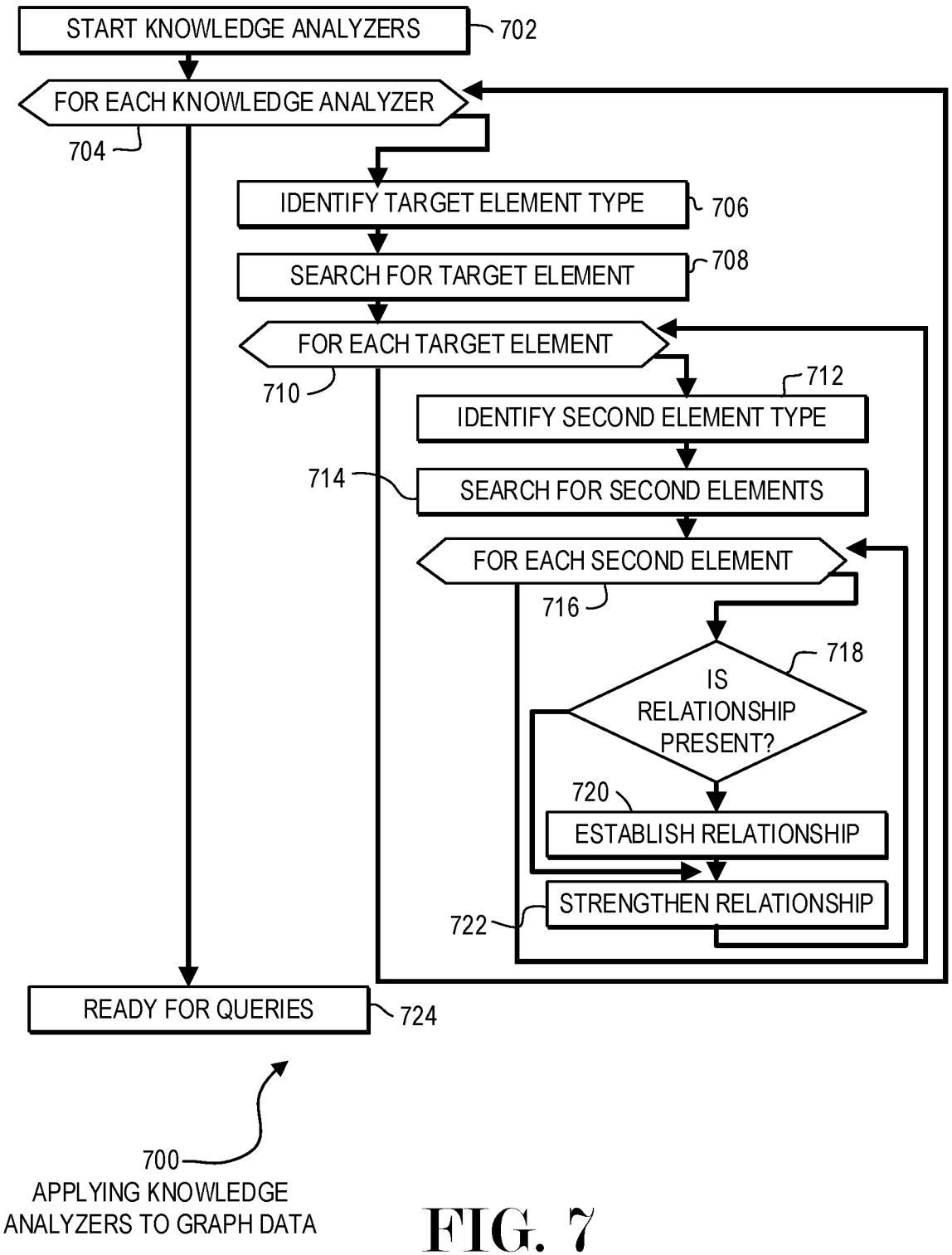
FIG. 7 is a flowchart illustration of an embodiment showing a method for using knowledge analyzers to infer and strengthen relationships in a graph.

FIG. 7 is a flowchart illustration of an embodiment 700 showing a method for applying knowledge analyzers to graph data. Embodiment 700 may illustrate a second level of analysis where inferences may be made on the data combined from multiple databases.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principals of operations in a simplified form.

Embodiment 700 may apply algorithms or heuristics to identify implied relationships between elements in the graph. Embodiment 700 may illustrate a system where multiple knowledge analyzers may be applied to a graph.

Such an embodiment may be expandable to accept new knowledge analyzers that may be developed by data scientists or domain experts to address different insights that may be gleaned from the data.

Embodiment 700 is merely one example of an architecture that may perform knowledge analysis on a graph. In the example of embodiment 700, the knowledge analyzers may operate by finding a first element or target, then searching for a second element that may be near the target. When the second element is present, a relationship may be inferred.

In a simple example of such a knowledge analyzer, a person who attends a work location on a regular basis may have an inferred work relationship between the company at the work location and the person. The first target element may be a place of work, and the second element may be a person who visits the location for most of the normal business hours.

Other knowledge analyzers may identify two, three, four, or more elements that may be present for an inferred relationship to occur. In the example of embodiment 700, a knowledge analyzer is illustrated that infers a relationship between two elements.

The knowledge analysis may begin in block 702. Each knowledge analyzer may be processed in block 704. For each knowledge analyzer in block 704, a target element type may be identified in block 706.

A search may be made in block 708 for the target element, and each target element may be analyzed in block 710. For each target element in block 710, a second element type may be identified in block 712 and searched in block 714.

Each of the second elements found in block 714 may be analyzed in block 716. For each of the second elements in block 716, if the relationship between the target element and the second element is not found in block 718, the relationship may be created in block 720. When the relationship is found in block 718, the relationship may be strengthened in block 722.

After processing all of the knowledge analyzers in block 704, the graph may be ready for queries in block 724.

Figure 8:
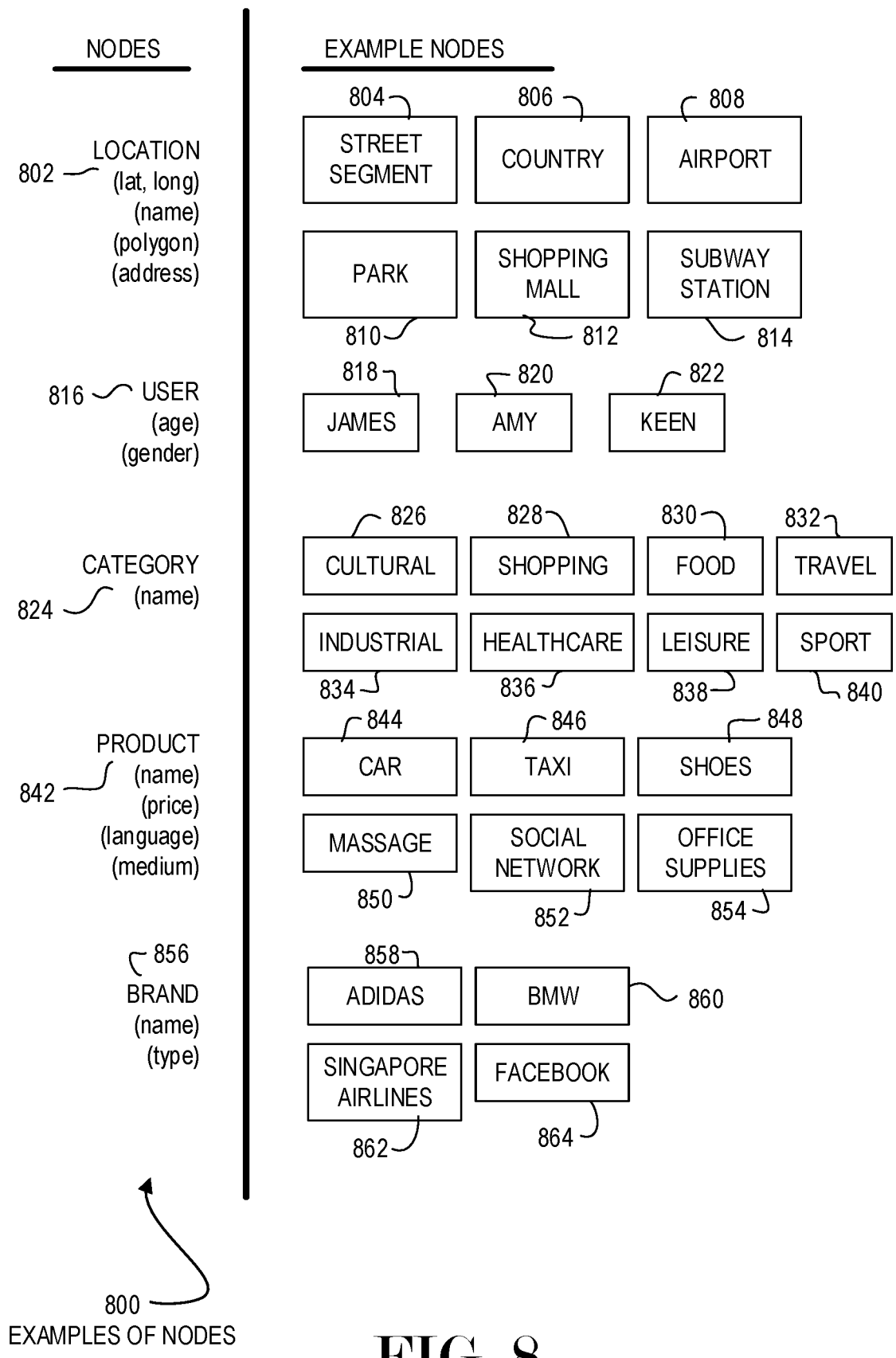
FIG. 8 is a diagram illustration of an example embodiment showing several types of nodes and examples of those types.

FIG. 8 is a diagram illustration of an embodiment 800 showing examples of nodes that may be present in a graph. Embodiment 800 is merely a simplified example of the different types of nodes and examples of these nodes.

Location nodes 802 may have various properties, such as latitude and longitude pairs, names, polygons describing a boundary, addresses, and other parameters. Examples of location nodes 802 may be street segments 804, country 806, airport 808, park 810, shopping mall 812, subway station 814, and other locations.

User nodes 816 may have properties such as age and gender. Example nodes may be James 818, Amy 820, and Keen 822. In many embodiments, the user nodes may be anonymized or obfuscated so that personally identifiable information may not be present in the graph. The identifiers of James 818, Amy 820, and Keen 822 may be placeholders or labels that may be associated with an anonymized or obfuscated identity and may not relate directly to any specific person.

A category node 824 may be any category of interest. Typically, a category may be a parameter for which searches may be performed or for which relationships may be inferred. Categories derived from various data sources, such as a television or movie database that may classify television shows or movies into categories.

Examples of different categories may be cultural 826, shopping 828, food 830, travel 832, industrial 834, healthcare 836, leisure 838, sport 840, and others.

Product nodes 842 may have properties such as name, price, language, medium, and other properties. A product may be a hard good, service, software, media content, or any other type of service. Examples may include a car 844, taxi 846, shoes 848, massage 850, social network 852, office supplies 854, and other products.

Brand nodes 856 may represent a company, product line, or other aggregation of products. Examples may be Adidas 858, BMW 860, Singapore Airlines 862, Facebook 864, and others.

Figure 9:
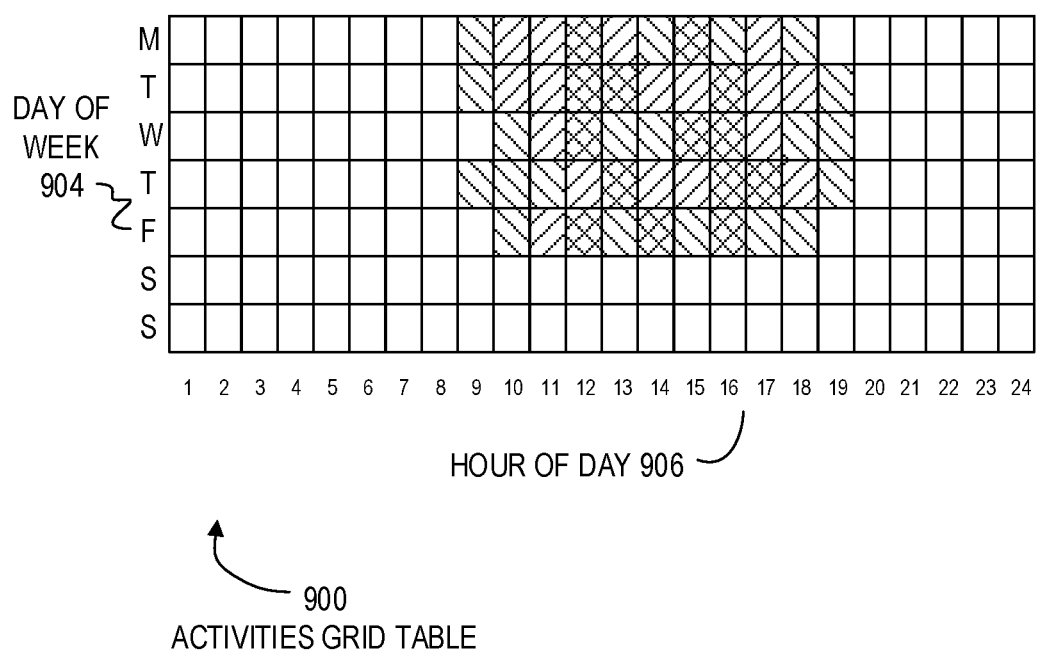
FIG. 9 is a diagram illustration of an example embodiment showing an activities grid table.

FIG. 9 is a diagram illustration of an example embodiment 900 showing an activities grid table. An activities grid table may illustrate a time-based interaction between to nodes in a graph. In the example of embodiment 900, the interaction may be between a user and a location, but this type of time-based interaction may be used for any type of relationship.

Relationships between any two nodes in a graph may be characterized by different time-based interactions. Some time-based relationships may be a periodic relationship, such as the times that an employee attends their place of work. Such relationships may have a distinct periodicity and may be summarized into a periodic time-based model.

Some relationships may persist over a long period of time and may have distinct beginning and ending events. In an employment relationship, for example, an employee's hiring and firing dates may mark calendar events that begin and end that relationship. After a separation event, employment relationships may not have much residual interaction.

Some relationships may persist over time and may degrade smoothly or change abruptly in response to some event. For example, a person may enjoy following a sports team. The person's enthusiasm for the team may swell in the initial stages and may persist at a near steady state for some period of time. An event may occur, such as mediocre performance of the team, and the person's enthusiasm may slowly decline. In some cases, the person's enthusiasm may decline rapidly if, for example, the team were to unceremoniously trade a star player. A person's relationships with brands, products, and other categories may have a similar ebb and flow.

In the activities grid table 900, the day of week 904 is displayed in the vertical axis and hour of day 906 in the horizontal axis. A grid of each hour of the week is formed, and each hour may have a value that may represent the strength of an interaction. In the example of embodiment 900, the interaction may simulate a worker's time spent at work. During normal business hours, the worker may be present at a place of employment. Some days, the worker may come in late and stay late, but in general the worker may be present from 8am to 5pm on Monday through Friday.

In the example of a worker and their place of employment, the relationship made be defined after observing the worker's behavior over many weeks, months, or years. The strength of relationship for a particular hour may be increased as the number of observations increases for that hour.

A relationship may be strengthened or weakened by the intensity of interactions. Some interactions may indicate a stronger relationship than others. For example, a user may watch merely one portion of a television show, which may indicate a lackluster and weak relationship. A second user may watch the entirety of the show, visit the show's website, and engage on social media relating to the show. The second user's interaction level is very strong, while the first one is weak. In such cases, a strength of a relationship may be determined by specific actions, each of which may have a different strength and may be aggregated by summing or other heuristic to determine a strength value.

Figure 10A:
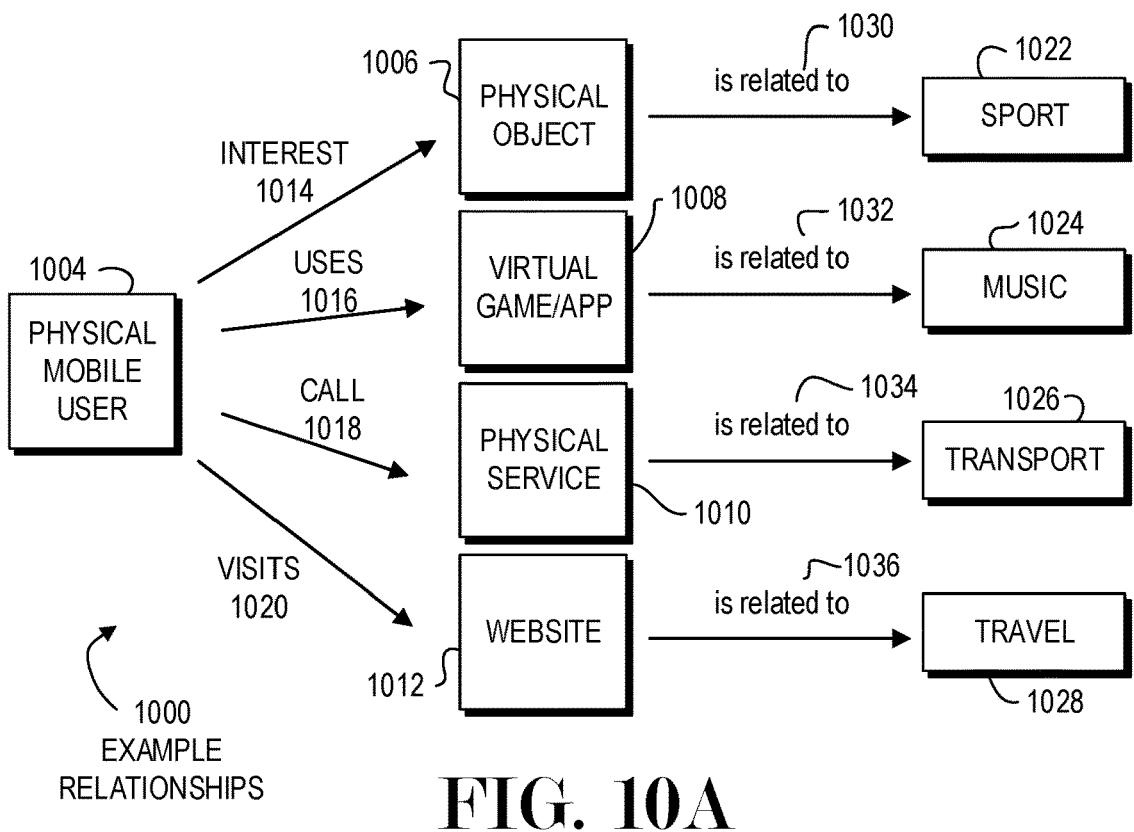
FIG. 10A is a diagram illustration of an example embodiment showing relationships.
Figure 10B:
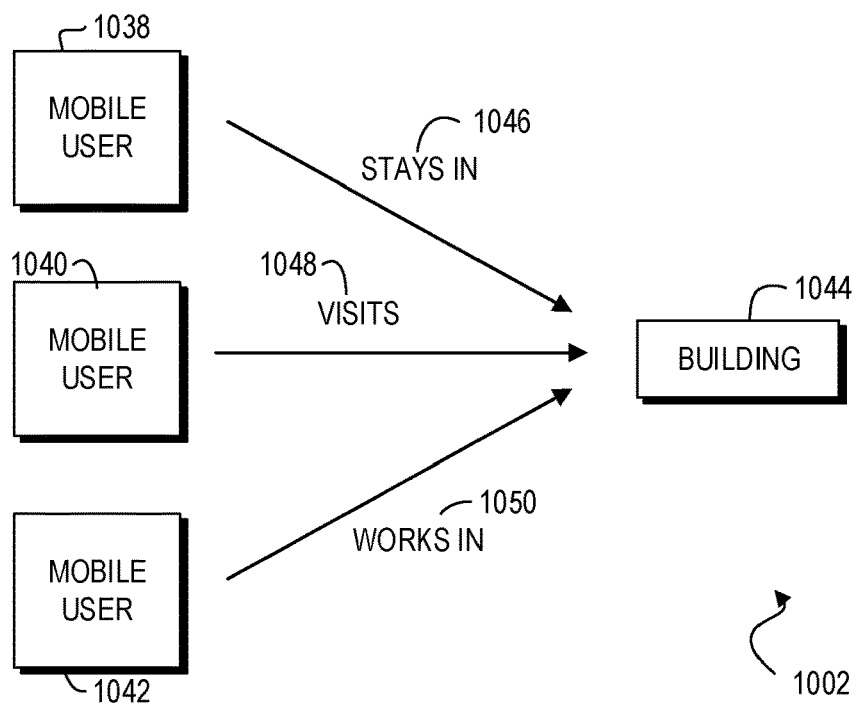
FIG. 10B is a diagram illustration of a second example embodiment showing relationships.

FIGS. 10A and 10B are diagram illustrations of example relationships 1000 and 1002 that may show relationships, some of which may vary over time.

The example relationships 1000 may illustrate relationships between a physical mobile user 1004 with various objects. From the objects, a relationship may be inferred to different categories. The examples of embodiments 1000 and 1002 use the notion of a physical mobile user. This term is meant to mean a physical person that may be detected using data gathered from mobile phone metadata. This is merely one example of the type of data that may be analyzed.

A physical mobile user 1004 may have various relationships, such as with a physical object 1006, a virtual game or application 1008, a physical service 1010, and a website 1012. The relationship with a physical object 1006, which may be a piece of sports equipment, may be defined by an interest relationship 1014. The interest relationship 1014 may be identified when the user scans a UPC barcode of an object when the user visits a sporting goods store, for example. Such a relationship may be a single event at a point in time. When the user plays a virtual game or application 1008, the usage relationship 1016 may have a time-based relationship that may include the time of day the user plays the game, the number and duration of playing sessions, and in some cases the intensity or interaction the user has while playing the game.

The user may request a physical service 1010, such as requesting a taxi, by placing a telephone call 1018. The time-based factors for such a relationship may be the time of day, day of week, season, proximity to a personal or calendar holiday, or some other factor. Similarly, a user may visit a website 1012, which may afford many different metrics for capturing engagement. Such metrics may include the time of day and other related factors, as well as the pages viewed, requests submitted, or other metrics.

Relationships to categories may be established from each of the various objects, games, services, websites, or other items with which a user interacts. From the knowledge that the physical object 1006 relates to sports 1022, an inferred relationship between the physical mobile user 1004 is made to sports 1022. Similarly, the relationship between the application or game 1008 to music 1024 may infer the user's taste and affinity for music. The physical service 1010 has a relationship 1034 to transportation, so the user's preferences for transportation may be inferred. The user's level of interest in a website 1012 may infer a relationship 1036 to travel 1028, which may be the content of the website.

The example relationships 1002 may illustrate inferences that may be drawn from evaluating time dependent factors of a relationships. Three different mobile users 1038, 1040, and 1042 and how those users interact with a location of a building 1044.

User 1038 may be assumed to live 1046 in the building 1044 when the user's interaction pattern matches a conventional person's living habits. For example, the user may spend a large majority of their evenings and weekends at the building.

User 1040 may visit 1048 the building 1044 when the user's interactions are sporadic and do not have a consistent pattern of either a place of employment or a home.

User 1042 may have an inferred work 1050 relationship with the building 1044 when the user's visitation habits have the consistency and regularity of working hours.

Figure 11A:
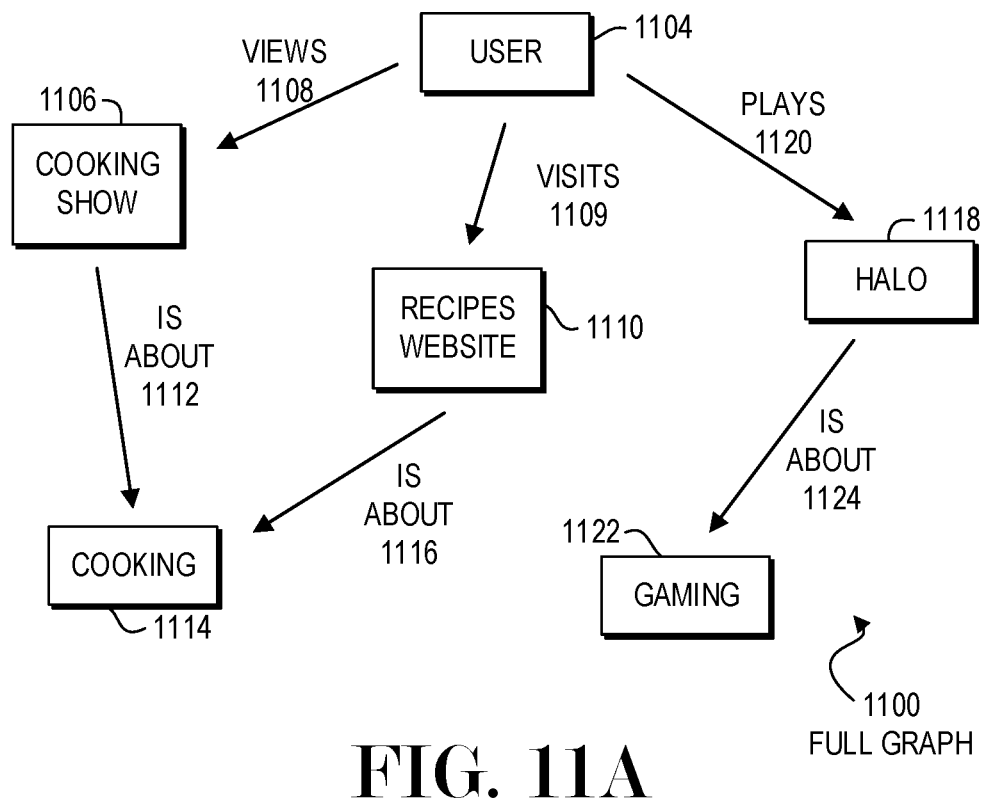
FIG. 11A is a diagram illustration of an example embodiment showing a graph with relationships.
Figure 11B:
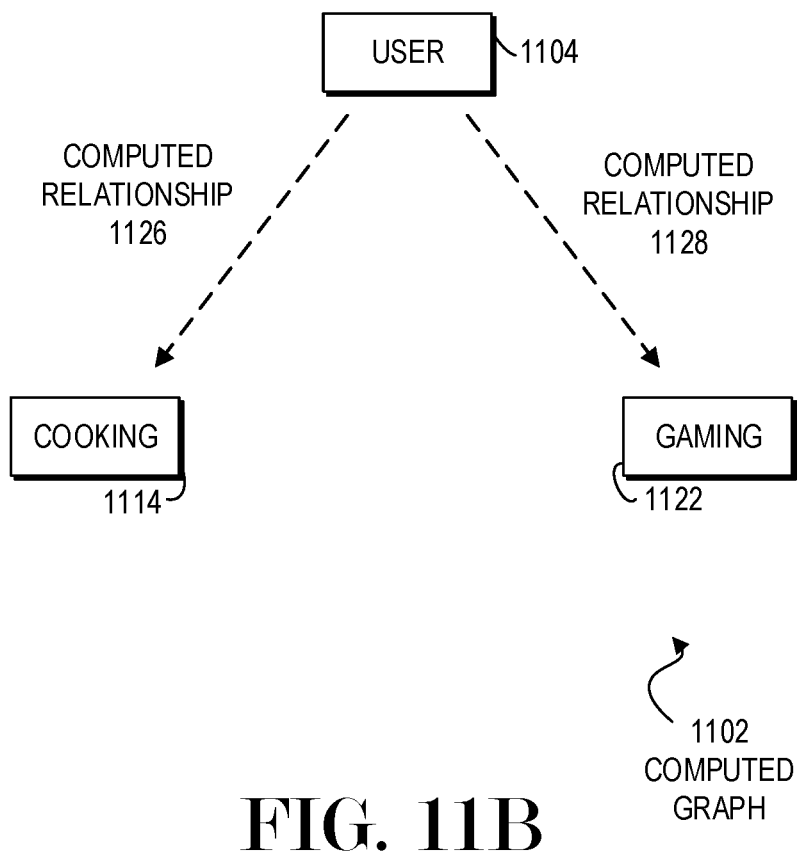
FIG. 11B is a diagram illustration of an example embodiment showing a computed graph with computed relationships.

FIGS. 11A and 11B are diagram illustrations of example graphs 1100 and 1102. Graph 1100 may illustrate raw data while graph 1102 may illustrate computed relationships that may be derived from the graph 1100.

In the full graph 1100, a user 1104 may be a user who views a cooking show 1106. A viewing relationship 1108 may be measured or determined from the user's viewing habits 1108. The user 1104 may visit a recipes website 1110, which may be measured from internet metadata as a visit relationship 1109. From the cooking show 1106, there may be a relationship 1112 to cooking, as well as a second relationship 1114 from the recipes website 1110 to cooking 1114.

The user 1104 may play the game Halo 1118, and a playing relationship 1120 may be detected. The game Halo 1118 may be related to the general category of gaming 1122 through a gaming relationship 1124.

In performing a query against the graph 1100, relationships between the user 1104 and the categories cooking 1114 and gaming 1122 may be given as computed relationships 1126 and 1128.

The computed relationship 1126 between the user 1104 and cooking 1114 may be computed by determining the viewing relationship 1108 of the television program and the television program's relationship 1112 to cooking. A second path of the user's visitation relationship 1109 to the recipes website 1110 and the websites' relationship 1116 to cooking 1114. The two paths may be aggregated by summing or applying another heuristic or algorithm.

The computed relationship 1128 between the user 1104 and gaming 1122 may be computing by determining the playing relationship 1120 to Halo 1118 and Halo's relationship 1124 to gaming 1122.

The computed graph 1102 may be determined in response to a query that may request the strength of relationships between various users and categories, such as cooking 1114 and gaming 1122.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principals of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method performed on at least one computer processor, said method comprising:
   receiving a first database comprising a plurality of first data elements, said first data elements being metadata elements collected by a wireless mobile telephone network, said first data elements comprising origin and receiving stations and time and duration of communications;
   receiving a second database comprising a plurality of second data elements, said second data elements being metadata elements collected by an internet service provider, said second data elements comprising a second user identification, a universal resource identifier accessed through a media connection;
   creating a graph having nodes and edges by an analysis method comprising:

for each of said first data elements and said second data elements, identifying a first ontological element, a second ontological element, and a relationship between said first and second ontological elements, said first and second ontological elements being nodes on said graph, said relationship being an edge on said graph;

searching said graph for said first and second ontological elements;

when said first and second ontological elements and said relationship are found in said graph, increasing said relationship in said graph;

when said first ontological element is found and said second ontological element is not found, adding said second ontological element and said relationship to said graph;

when said first and second ontological elements are not found, adding said first and second ontological elements and said relationship to said graph.

2. The method of claim 1 further comprising:

analyzing said graph to infer a property from said first ontological element to said second ontological element, said property being an inherent property of said second ontological element.

3. The method of claim 2 further comprising:

determining a time-based aspect for said property and storing said time-based aspect for said relationship.

4. The method of claim 3, said time-based aspect being a recurring event.

5. The method of claim 4, said recurring event being a daily event.

6. The method of claim 5 further comprising:

identifying a contradictory inference between said first ontological element and said second ontological element, said contradictory inference indicating that said time-based aspect has changed; and changing said time-based aspect based on said contradictory inference.

7. The method of claim 6, said changing comprising removing said time-based aspect.

8. The method of claim 6, said changing comprising strengthening said time-based aspect.

9. The method of claim 3, said time-based aspect being a decaying relationship that degrades over time.

10. The method of claim 9 further comprising:

identifying a second inferred property between said first ontological element and said second ontological element, and strengthening said time-based aspect based on said second inferred property.

11. The method of claim 10 further comprising:

identifying a third inferred property between said first ontological element and said second ontological element, and weakening said time-based aspect based on said third inferred property.

12. A system comprising:

a first database comprising a plurality of first data elements, said first data elements being metadata elements collected by a wireless mobile telephone network, said first data elements comprising origin and receiving stations and time and duration of communications;

a second database comprising a plurality of second data elements, said second data elements being metadata elements collected by an internet service, said second data elements comprising a second user identification, a universal resource identifier accessed through a media connection;

a graph builder that operates on a hardware processor, said graph builder that:

for each of said first data elements and said second data elements, identifies a first ontological element, a second ontological element, and a relationship between said first and second ontological elements, said first and second ontological elements being nodes on said graph, said relationship being an edge on said graph;

searches said graph for said first and second ontological elements;

when said first and second ontological elements and said relationship are found in said graph, increases said relationship in said graph;

when said first ontological element is found and said second ontological element is not found, adds said second ontological element and said relationship to said graph;

when said first and second ontological elements are not found, adds said first and second ontological elements and said relationship to said graph.

13. The system of claim 12, said graph builder that further:

analyzes said graph to infer a property from said first ontological element to said second ontological element, said property being an inherent property of said second ontological element.

14. The system of claim 13, said graph builder that further:

determines a time-based aspect for said property and storing said time-based aspect for said relationship.

15. The system of claim 14, said time-based aspect being a recurring event.

16. The system of claim 15, said recurring event being a daily event.

17. The system of claim 16, said graph builder that further:

identifies a contradictory inference between said first ontological element and said second ontological element, said contradictory inference indicating that said time-based aspect has changed; and changes said time-based aspect based on said contradictory inference.

18. The system of claim 17, said changing comprising removing said time-based aspect.

19. The system of claim 17, said changing comprising strengthening said time-based aspect.

20. The system of claim 14, said time-based aspect being a decaying relationship that degrades over time.

21. The system of claim 20, said graph builder that further:

identifies a second inferred property between said first ontological element and said second ontological element, and strengthens said time-based aspect based on said second inferred property.

22. The system of claim 21, said graph builder that further:

identifies a third inferred property between said first ontological element and said second ontological element, and weakens said time-based aspect based on said third inferred property.

* * * * *